(12) United States Patent
Miyata et al.

(10) Patent No.: US 7,781,020 B2
(45) Date of Patent: Aug. 24, 2010

(54) STRUCTURED MATERIAL AND PRODUCING METHOD THEREOF

(75) Inventors: Hirokatsu Miyata, Hadano (JP); Shinichi Nakamura, Isehara (JP); Akira Kuriyama, Atsugi (JP); Miki Ogawa, Tokyo (JP); Yasuhiro Kawashima, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1117 days.

(21) Appl. No.: 10/546,450

(22) PCT Filed: Jul. 23, 2004

(86) PCT No.: PCT/JP2004/010888
§ 371 (c)(1),
(2), (4) Date: Aug. 19, 2005

(87) PCT Pub. No.: WO2005/008684
PCT Pub. Date: Jan. 27, 2005

(65) Prior Publication Data
US 2006/0147677 A1    Jul. 6, 2006

(30) Foreign Application Priority Data
Jul. 23, 2003  (JP) ............................. 2003-278340

(51) Int. Cl.
*B05D 3/04* (2006.01)
*C08F 2/48* (2006.01)

(52) U.S. Cl. ..................... 427/335; 427/337; 427/340; 427/372.2; 427/385.5; 427/487; 427/508

(58) Field of Classification Search ................ 427/335, 427/337, 340, 372.2, 385.5, 487, 508
See application file for complete search history.

(56) References Cited

U.S. PATENT DOCUMENTS 4,732,879 A * 3/1988 Kalinowski et al. ............ 502/5
6,314,317 B1 * 11/2001 Willis .......................... 604/20

(Continued)

FOREIGN PATENT DOCUMENTS

EP    1 205 943 A2    5/2002

(Continued)

OTHER PUBLICATIONS

Aida et al, Angewandte Chemie, International Edition, 2001, 40, pp. 3803-3806.*

(Continued)

*Primary Examiner*—Elena T Lightfoot
(74) *Attorney, Agent, or Firm*—Fitzpatrick, Cella, Harper & Scinto

(57) ABSTRACT

A structured material characterized in having, on a substrate, a layer having tubular pores positioned uniaxially parallel to the interface of the substrate and the layer and supporting a conductive polymer material having a function of a surfactant therein. A method for producing the above structure material characterized by the steps of providing a substrate having the anisotropy on a surface, applying a solution containing a surfactant having a functional group for polymerization in the molecular structure, a solvent therefor, and a solute different from the surfactant to the substrate, and a step of standing for a predetermined time for causing the surfactant to assemble in a predetermined direction based on the anisotropy of the substrate.

5 Claims, 7 Drawing Sheets

U.S. PATENT DOCUMENTS

| | | |
|---|---|---|
| 6,846,546 B2 | 1/2005 | Kuroda et al. ............... 428/188 |
| 2002/0046682 A1 | 4/2002 | Fan et al. ............... 106/287.11 |
| 2003/0039744 A1 | 2/2003 | Fan et al. .................... 427/102 |
| 2005/0048264 A1 | 3/2005 | Kuroda et al. ............... 428/166 |

FOREIGN PATENT DOCUMENTS

| | | |
|---|---|---|
| JP | 61-218602 A | 9/1986 |
| JP | 10-204124 A | 8/1998 |
| JP | 10-325956 A | 12/1998 |
| JP | 2001-145831 | 5/2001 |
| JP | 2002-040240 A | 2/2002 |
| JP | 2002-338228 A | 11/2002 |
| JP | 2003-109490 A | 4/2003 |

OTHER PUBLICATIONS

Takuzo Aida et al., "Photoluminescent Silicate Microsticks Containing Aligned Nanodomains of Conjugated Polymers by Sol-Gel-Based in Situ Polymerization," 40(20) *Angew. Chem. Int. Ed.* 3803-06 (2001).

Frank Marlow et al., "The Internal Architecture of Mesoporous Silica Fibers," 12(13) *Adv. Mater.* 961-65 (Jul. 2000).

Thuc-Quyen Nguyen et al., "Control of Energy Transfer in Oriented Conjugated Polymer-Mesoporous Silica Composites," 288(5466) *Science* 652-56 (Apr. 2000).

Hirokatsu Miyata et al., "Formation of a Continuous Mesoporous Silica Film with Fully Aligned Mesochannels on a Glass Substrate," 12 *Chem. Mater.* 49-54 (2000).

* cited by examiner

FIG. 5A
$CH_3(CH_2)_n-C \equiv C-C \equiv C-(CH_2)_m-COO(CH_2CH_2O)_1H$
FIG. 5B
$CH_3(CH_2)_n-C \equiv C-C \equiv C-(CH_2)_m-N^+(CH_3)_3Br^-$
FIG. 5C
$CH_3(CH_2)_n-C \equiv C-C \equiv C-(CH_2)_m-O(CH_2CH_2O)_1H$
FIG. 5D
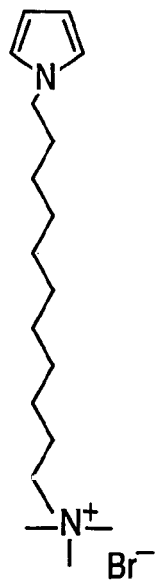
FIG. 5E
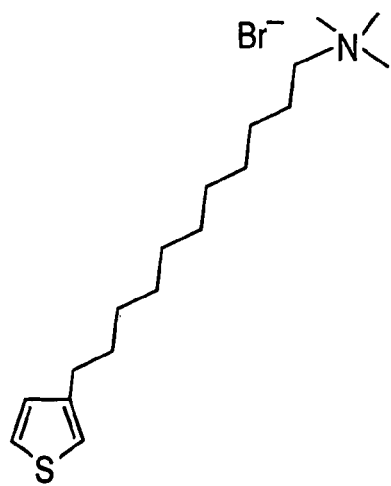

STRUCTURED MATERIAL AND PRODUCING METHOD THEREOF

This application claims priority from Japanese Patent Application No. 2003-278340, filed on Jul. 23, 2003, which is hereby incorporated herein by reference.

TECHNICAL FIELD

The present invention relates to a structured material including a polymer compound, and more particularly, to a technology for orienting chains of a polymer utilizing pore-orienting technology.

BACKGROUND ART

Conductive polymers are being actively investigated because of their potential in production of inexpensive organic transistors. Conductive polymers have a structure in which a conjugated chain extends as a main chain, and show a high conductivity in such a direction. However, such conductive polymers are utilized in a bulk state because of the absence of an effective technology for orienting main chains of the conductive polymer, and sufficient electroconductivity is currently not obtained because the conduction between the polymer chains is achieved by the hopping conduction. For orienting the polymer chains, investigations are being conducted, for example, utilizing a Langmuir-Blodgett film.

A structured material prepared by using molecular assemblies of surfactants as a template has a structure in which molecular assemblies of the surfactant are regularly arranged by self-organization in a matrix of an inorganic compound. Particularly, a structured material having pores of an average diameter of 2 to 50 nm is called a mesoporous structure, which is referred to as a mesostructured material in the present description. A structured material in which pores are filled with a material is also called a mesostructured material. Initially, the inorganic compound was limited to silica, but such a structure can now be prepared with various materials such as oxides, metals or sulfides. A structure in which pore walls are constituted of an inorganic-organic nanocomposite material is now also available. Also, the originally found material was in a powder state, but now various forms, such as a film, a fiber, a sphere etc., are available.

The mesostructured material, by making it possible to introduce another material into regular nanospaces, thereby controlling structure or orientation of such material, is expected to be of use for applications in electronic materials and optical materials in addition to conventional applications of porous materials, such as an adsorption/separation material or a catalyst, and investigations are being conducted in a wide variety of fields. There are principally two methods for introducing a material into the pores of a mesostructure material. One is to eliminate the surfactant assemblies constituting pores and introduce a guest material into thus formed hollow pores. This method is generally employed for mesoporous silica, but cannot be applied to a material in which the mesostructure is damaged by the elimination of the surfactant assemblies. This method has a difficulty related to the introduction of a bulky guest species, such as a polymer material, when the structure is a film or the like. The other method is to make the guest species coexist during the preparation of a mesostructured material, whereby the guest species is held in the pores at the time the mesostructured material is prepared. This method has an advantage in that it is applicable to a wide range of mesostructure materials since the surfactant need not be eliminated, but there is a considerable limitation as to the guest species that can be introduced by this method.

There recently has been reported a technology of forming a functional material in pores by a method other than the two methods mentioned above. This method is based on providing the surfactant itself with a functionality and preparing a mesostructured material having a functional material in the pores without eliminating the surfactant. This method is applied to a film, or a fiber as described in *Angewandte Chemie*, International Edition, 40, pp. 3803-3806, in which a mesostructured material is prepared by using surfactants having a polymerizable functional group in the molecular structure and then polymerization is achieved by heat etc., thereby preparing conductive polymer chains in the pore.

However, the aforementioned method of preparing a mesostructured material utilizing surfactants having a polymerizable functional group in the molecular structure is difficult to practice because of the following reasons.

In a film employed in prior technologies, tubular pores in the film plane have random directions so that the polymer chains have random directions macroscopically even if a polymer chain is formed along the pore direction. On the other hand, a fibered structure is small and difficult to handle, and also, as described in *Advanced Materials*, 12, pp 961-965, a pore formed a spiral in the fiber. Consequently, even if the polymer chain is oriented along the direction of the pore, the polymer chain assumes a spiral form in this method so that it is difficult to control the direction of the polymer chain by the pores.

On the other hand, *Science*, 288, pp 652-656 describes a partial orientation of a conductive polymer compound utilizing a mesostructured silica monolith in which pore direction is oriented by a strong magnetic field. This method eliminates the surfactant by calcination after the preparation of a mesostructured silica and to introduce a conductive polymer compound into thus formed hollow nanospace, but the obtained mesostructured silica, having numberless fine cracks, is difficult to apply to an optical material or an electronic material, and an alignment control of conductive polymer main chains over the entire structure is not achieved as the polymers present in such cracks are random.

The present invention is to achieve an orientation control of polymer chains on a macroscopic scale, utilizing a mesostructured film in which tubular pores are oriented in one direction.

SUMMARY OF THE INVENTION

The present invention provides a structured material formed by a layer having tubular pores on a substrate, in which the tubular pores are positioned parallel to the interface of the substrate and the layer, and a conductive polymer is held in the tubular pores.

The present invention also provides a production method for a structured material, which comprises the steps of: applying a solution containing surfactants that has a polymerizable functional group in the molecular structure, a solvent, and a solute different from the surfactants, onto a substrate having anisotropy, and the step of leaving the product of the above step standing for a predetermined time for causing the surfactant to assemble in a direction on the basis of the anisotropy of the substrate.

BRIEF DESCRIPTION OF THE DRAWINGS

FIGS. 5A, 5B, 5C, 5D, and 5E show chemical structures of surfactants advantageously employed in the present invention.

BEST MODE FOR CARRYING OUT THE INVENTION

Figure 1:
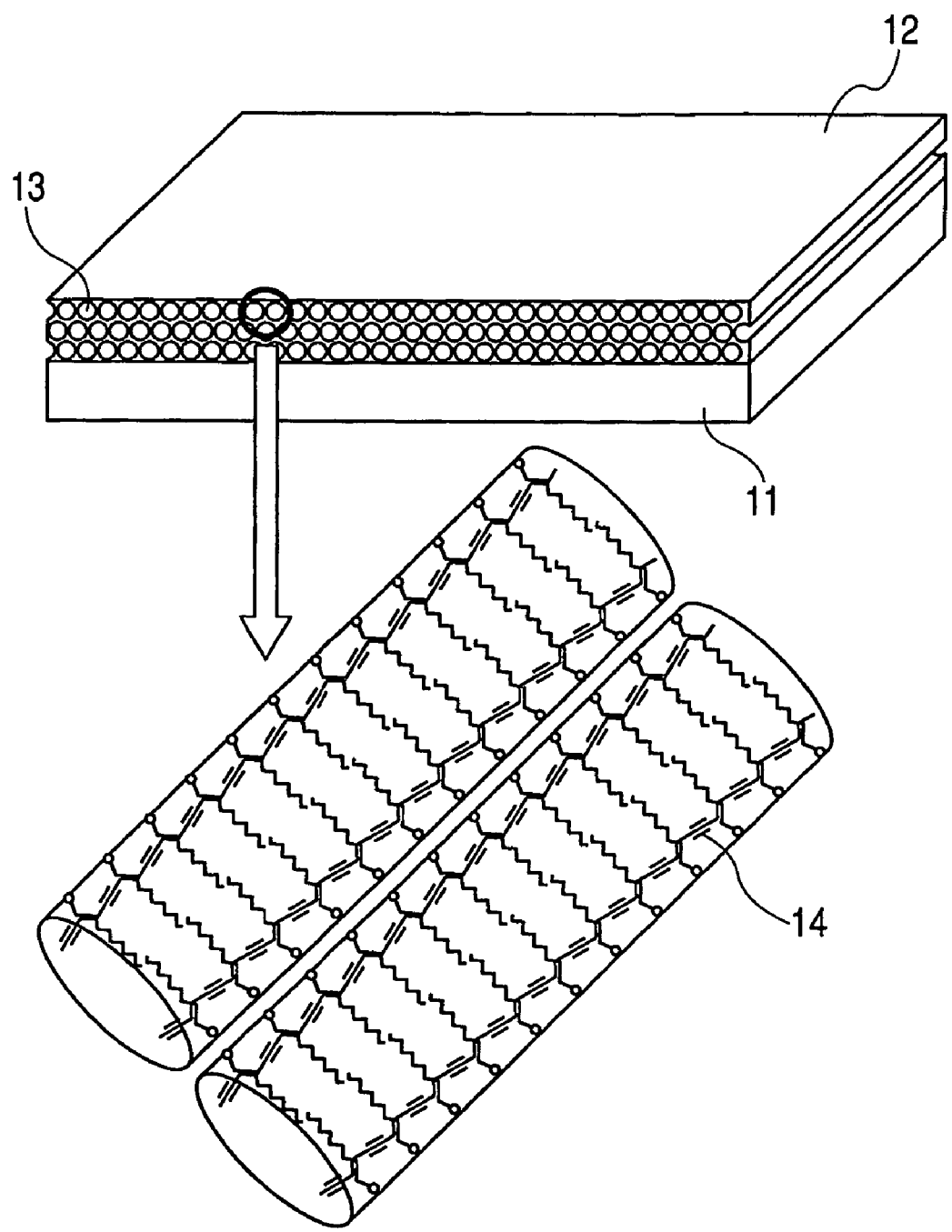
FIG. 1 is a schematic view of a mesostructured film prepared in the present invention including orienting conjugated polymer chains in the pores.
Figure 6:
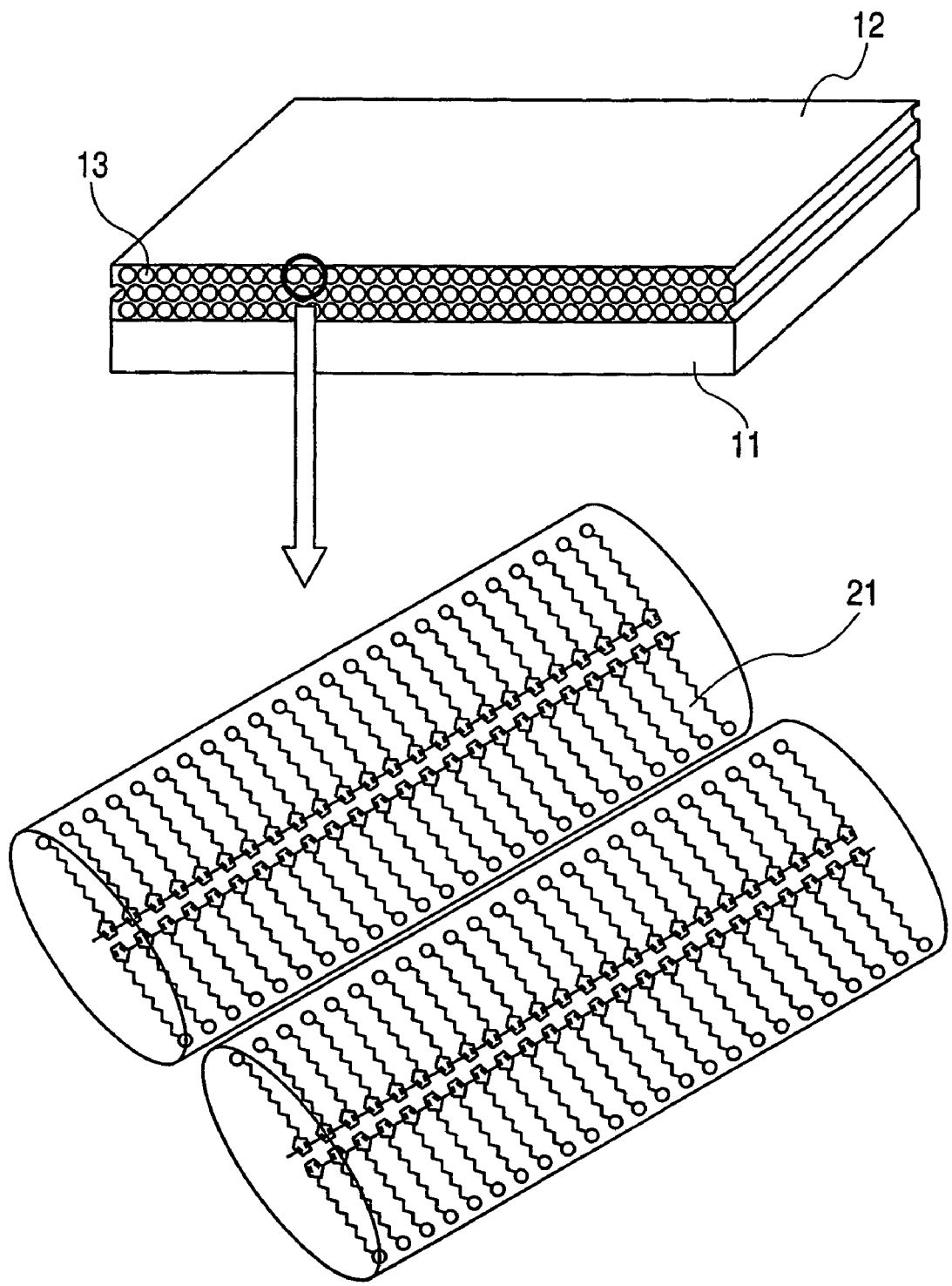
FIG. 6 is an another schematic view of a mesostructured film prepared in the present invention including orienting conjugated polymer chains in the pores.

An oriented mesostructured film including a conjugated polymer in the present invention has a structure, for example, as schematically shown in FIG. 1. A mesostructured film 12 having tubular pores of a honeycomb structure is formed on a substrate 11 having a structural anisotropy at the surface. In the mesostructured film, tubular mesopores 13 are oriented in one direction. In the pore, as illustrated, a conjugated polymer is formed by polymerization of surfactants. The present inventors estimate that a single tubular pore contains plural conjugated polymer chains 14 (FIG. 1) or 21 (FIG. 6). The conjugated polymer chain 14 indicates a polydiacetylene derivative, while the chain 21 indicates a polypyrrole derivative.

The oriented mesostructured film including the conjugated polymer in the present invention is formed by causing a polymerization reaction of the surfactant molecules in the pores formed by assemblies of surfactants 22 having a polymerizable functional group as a template. The film before polymerization is also an embodiment of the present invention. The surfactant assemblies exist in a tubular formation in a composite material, and its cross section is schematically illustrated by 21 in FIG. 2.

In the following, there will be given detailed descriptions on methods of producing an oriented mesostructured film of the present invention, including the conjugated polymer compound, and a detailed configuration thereof.

Figure 2:
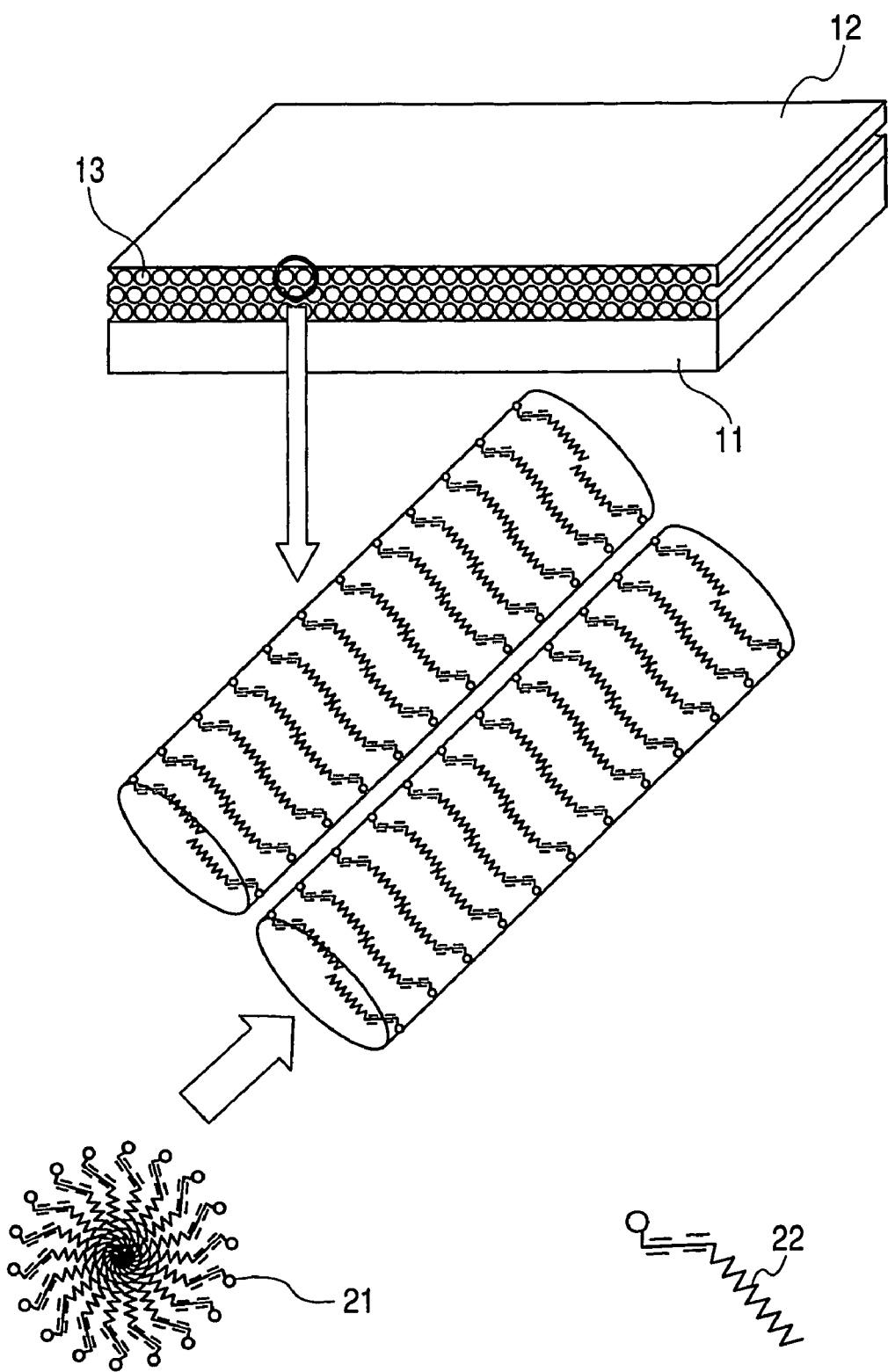
FIG. 2 is a schematic view of a mesostructured film before polymerization.

In configurations shown in FIGS. 1 and 2, the numeral 11 denotes a substrate having a structural anisotropy on the surface. The substrate having the surface anisotropy employable in the present invention generally belongs in one of the following two categories. One is a crystalline substrate having a strong anisotropy in an atomic arrangement on the surface, and the other is an ordinary substrate, such as glass, on the surface of which a material having a structural anisotropy is provided.

The method of utilizing a crystalline substrate having a strong anisotropy in the atomic arrangement on the surface requires the use of a relatively expensive monocrystalline substrate. However, there is an advantage in that a mesostructured material having oriented tubular pores can be directly formed on the substrate. In such a case, when a conductive monocrystalline substrate is used, a satisfactory electric contact between the substrate and the conductive polymer in the pore is expected. A preferable crystalline substrate with a strong anisotropy in the atomic arrangement is a substrate the surface atomic arrangement of which shows a twofold symmetry. On the surface of such a crystalline substrate, the direction of a specified arrangement of atoms is uniquely determined, thereby realizing an ability of orienting the surfactant assemblies. There is preferably employed a single crystal substrate having a diamond-like crystal structure or the (110) plane of a single crystal substrate of a sphalerite-like crystal structure, particularly the (110) plane of silicon.

A method of forming a material having a structural anisotropy on a surface of an ordinary substrate, though involving an extremely thin layer between the substrate and the mesostructured material, has an advantage of achieving a highly uniaxial orienting property with an inexpensive material. As a material having a structural anisotropy on the surface of the substrate, there is advantageously employed a Langmuir-Blodgett film of a polymer or a polymer film subjected to a rubbing process.

First, a method for preparing a substrate will be explained. When a crystalline substrate having a surface atomic arrangement with a twofold symmetry is used for preparation of a mesostructured material, the substrate is sufficiently washed to expose a clean crystal surface. Then, for example, in a case of a silicon substrate, a spontaneous oxide film on the surface is eliminated. This can be achieved by a simple process, for example, by treating the surface with diluted hydrofluoric acid for several minutes. A substrate with a crystal surface exposed by such treatment can be directly employed in the preparation of a mesostructured film, which is discussed below.

Then a case where a material having a structural anisotropy is formed on a surface of an ordinary substrate will be explained.

First, there will be explained a method of forming a Langmuir-Blodgett film (LB film) of a polymer compound. The LB film is formed by transferring a monomolecular film, developed on a water surface, onto the substrate, and can be formed as a film of a desired number of layers by repeating this film formation. The term LB film used in the present invention includes laminated monomolecular films of an LB film derivative, formed by a heat treatment or the like, to an LB film formed on the substrate to modify the chemical structure while maintaining the laminated structure.

Figure 3:
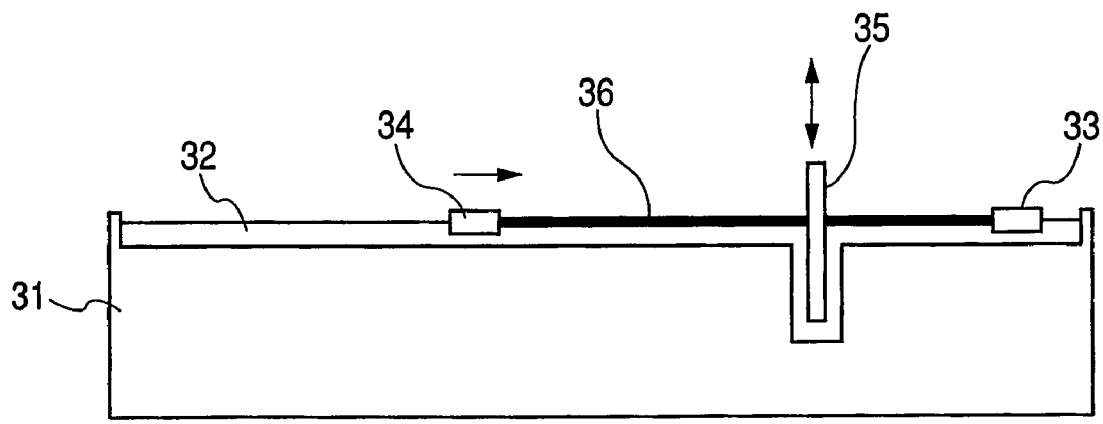
FIG. 3 is a schematic view showing an apparatus for preparing a Langmuir-Blodgett film to be employed in the present invention.

The LB film can be prepared by an ordinary method. An ordinary LB film forming apparatus is schematically shown in FIG. 3. In FIG. 3, there are shown a tank 31 filled with pure water 32, and a fixed barrier 33 with a surface pressure sensor (not shown). A monomolecular film 36 on the water surface is formed by dropping a liquid, in which a desired substance or a precursor of a desired substance is dissolved, onto the water surface in an area between the barrier 33 and a movable barrier 34. A surface pressure is applied to the film by a movement of the movable barrier 34. The movable barrier is position-controlled by the surface pressure sensor in such a manner that a constant surface pressure is applied during the film formation on the substrate. The pure water is maintained in a clean state by a water supply apparatus and a water discharge apparatus (not shown). The water tank 32 is provided with a hole, at which position a substrate 35 is held to be moved vertically at a constant speed by a translation movement device (not shown). The film on the water surface is taken up onto the substrate when it is immersed into water or extracted therefrom.

The LB film employed in the present invention is formed on the substrate as a monomolecular layer at a time, by applying a surface pressure to a monomolecular layer formed on the water surface in the aforementioned apparatus and immersing and extracting the substrate into and from the water. The form and properties of the film are controlled by the surface pressure, the moving speed of the substrate in immersion/extraction, and the layer number. The optimum surface pressure for the film formation is determined according to a surface area-surface pressure curve, but is generally within a range from several to several tens of mN/m. Also the moving speed of the substrate is generally within a range from several to several hundred mm/min. The number of layers is suitably determined within a range from several layers to several hundred layers. The LB film formation is generally prepared by the aforementioned method, but it is not limited thereto, and there can also be employed, for example, a method utilizing a flow of water constituting a sub-phase.

A material constituting the LB film is not particularly limited as long as it can withstand a process for forming a mesostructured film discussed below and is capable of controlling uniaxial orientation of the pores in the mesostructure, and, for example, a polyimide can be advantageously employed.

In the following, there will be explained a method of utilizing a substrate bearing a polymer film subjected to a rubbing process. The rubbing process is a method of coating a polymer on the substrate, for example, by spin coating, and rubbing such coating with a cloth or the like. The rubbing cloth is wound on a roller, and the rubbing is conducted by contacting the rotating roller with the surface of the substrate and moving a stage supporting the substrate in a direction with respect to the roller.

The rubbing cloth is optimally selected according to the polymer material to be used, but can be an ordinary material, such as nylon or rayon. The rubbing intensity is optimized by parameters, such as the revolution of the roller, pressure of the roller to the substrate, and the moving speed of the stage supporting the substrate.

In the following, a method for forming a mesostructured film on the substrate will be explained. The method for forming a mesostructured film on the substrate is classified largely into two categories. One is based on heterogeneous nucleation and growth from a solution to a surface of a substrate, while the other being based on a sol-gel method.

First, a method based on heterogeneous nucleation and growth occurring at the solid-liquid interface will be explained. This method is principally used for preparing a mesostructured silica film by a process similar to crystal growth. In this method, an aforementioned substrate is maintained in a precursor solution containing a raw material for a desired pore wall constituting material in an aqueous solution of surfactants, whereby a mesostructured film is formed on the substrate.

Figure 4:
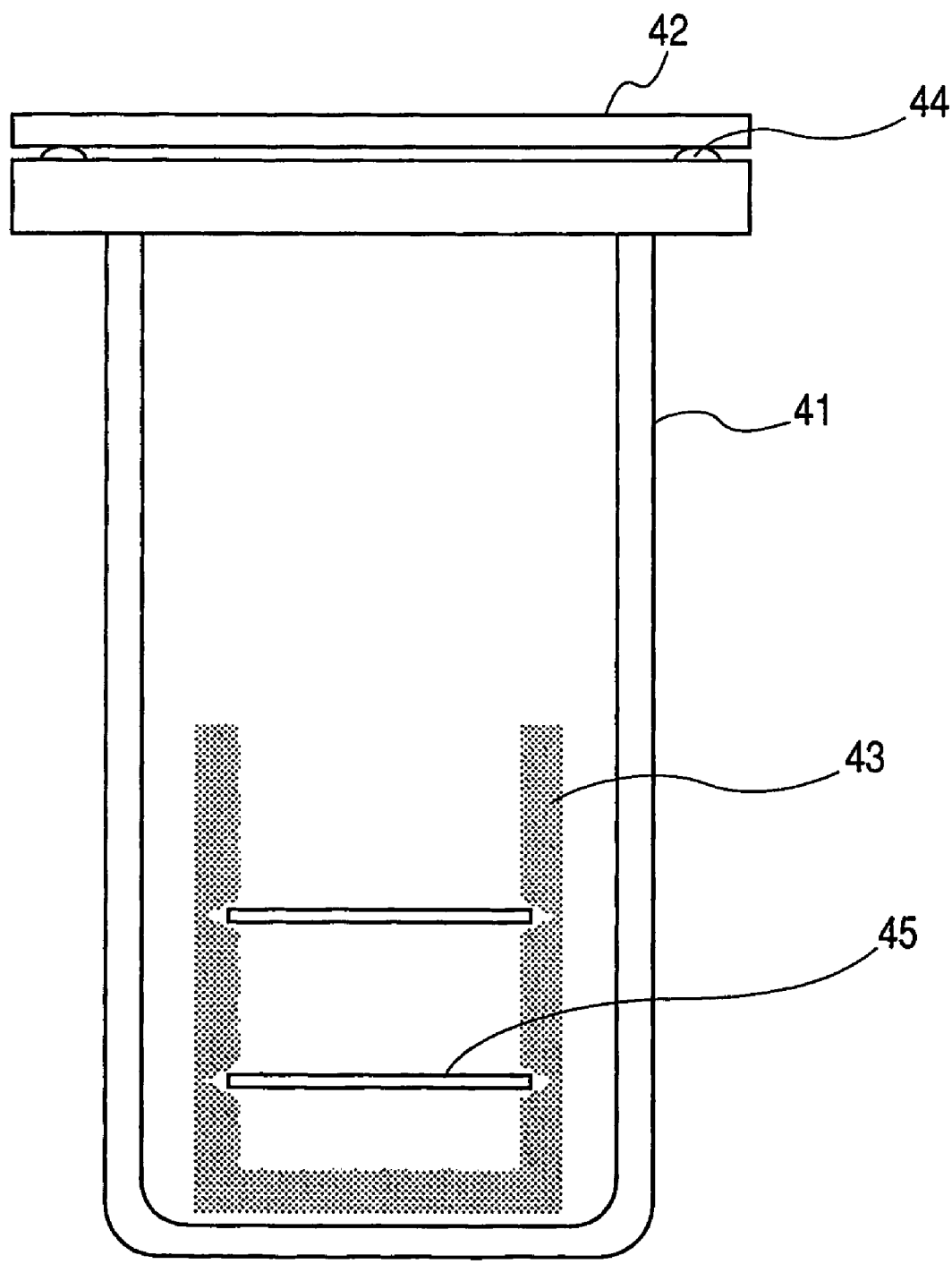
FIG. 4 is a schematic view showing a reaction vessel for preparing, in the present invention, a mesostructured film having orienting tubular pores by heterogeneous nucleation and growth.

A reaction vessel to be used for the formation of the mesostructured film, for example, has a structure as shown in FIG. 4. The material constituting the reaction vessel 41 is not particularly limited as long as it does not affect the reaction, and can be, for example, polypropylene or Teflon (registered trade name). The reaction vessel may be placed in a closed container of a highly rigid material, such as stainless steel, in order for it not to be damaged even if pressure is applied during the reaction. In the reaction vessel, a substrate holder 43 is provided as shown in FIG. 4 for supporting a substrate 45. During the reaction, the formation of the mesostructured material takes place not only on the substrate, but also in the solution, so that a precipitate in the solution is deposited onto the substrate. In order to prevent such a situation, the substrate is held facing down, i.e., with the film forming surface downward, in the solution during the reaction.

The reaction solution is formed by adding an acid etc., to an aqueous solution of surfactants for regulating the pH so that it is suitable for the formation of a desired pore wall, and adding a raw material substance, such as an alkoxide, for a desired material. A preferable alkoxide is one that generates water-soluble alcohol by hydrolysis.

The surfactant to be employed is provided, in the molecular structure, with a functional group capable of forming a conjugated polymer by polymerization, and is preferably a cationic surfactant having ammonium as a hydrophilic group, as indicated by FIG. 5B, 5D or 5E, or a nonionic surfactant having polyethylene oxide as a hydrophilic group, as indicated by FIG. 5A or 5C.

However, the usable surfactant is not limited to these. Also, the length of a hydrophobic group and the size of a hydrophilic group in the surfactant molecule are determined according to the pore size of a desired mesostructure. The position of the polymerizable functional group in the molecular structure is so determined as to do an optimum polymerization behavior.

The functional group capable of forming a polymer compound by polymerization is preferably a diacetylene group, a pyrrole group, a thiophene group etc., and a surfactant containing such a group in the structure can provide polydiacetylene, polypyrrole, polythiophene etc., as discussed below. However, the functional group capable of forming a polymer compound applicable in the present invention and the formed polymer compound are not limited to the foregoing examples, and any conjugated polymer compound that can be formed by polymerization in the pore may be employed.

In the present invention, the aforementioned substrate having the structural anisotropy on a surface is placed in the above-explained precursor solution and is maintained for 1 to 10 days at a temperature optimized for the compound constituting the desired pore wall, whereby a mesostructured film having tubular pores in a controlled direction is formed on the substrate. The film thickness can be controlled, for example, by the reaction time. In such a mesostructured material, the assemblies of surfactants having a polymerizable functional group in the molecular structure constitute a template for the tubular pore.

In the following, a method based on a sol-gel process will be explained. It is a simple method applicable to the preparation of a mesostructured film of various materials, and involves coating a precursor solution, containing surfactants and a pore wall raw material, on a substrate, evaporating the solvents, hydrolysis and condensation.

The precursor solution employed in this method is formed by adding a raw material for the pore wall constituting material to a solution of surfactants. For the solvent, an alcohol, such as ethanol or isopropanol, is advantageously employed, but this is not restrictive and, for example, a mixture of alcohol and water or water may be used depending on the desired pore wall material.

The raw material for the pore wall is not particularly limited as long as it can form the desired material by hydrolysis, and can advantageously be a metal halide or an alkoxide, particularly preferably tin chloride, tin alkoxide, titanium chloride, titanium alkoxide, silicon chloride or silicon alkoxide.

The surfactant to be employed includes in its molecular structure, as in the case of the method based on heterogeneous nucleation and growth, a functional group capable of polymerization to form a conjugated polymer. In this method, there are preferably employed surfactants including polyethylene oxide as a hydrophilic group. Therefore, among the structures shown in FIGS. 5A to 5E, those indicated by FIGS. 5A and 5C are usable. However, the usable surfactant is not limited to such structures. Also, in the surfactant molecule to be used, a length of a hydrophobic group and a size of a hydrophilic group are determined according to pore size of a desired mesostructured material. The position of the polymerizable functional group in the molecular structure is determined so as to achieve an optimum polymerization behavior.

The precursor solution of the above-described composition is applied on the aforementioned substrate having the anisotropy, or placed on an arbitrary position thereon. The coating can be achieved by various methods, such as dip coating, spin coating or mist coating. Other coating methods capable of uniform coating are also applicable. An apparatus for spin coating or dip coating can be an ordinary one without any particular restriction, but means for controlling the temperature of the solution and means for controlling temperature and humidity of the atmosphere for coating may be provided in certain cases.

Figure 7:
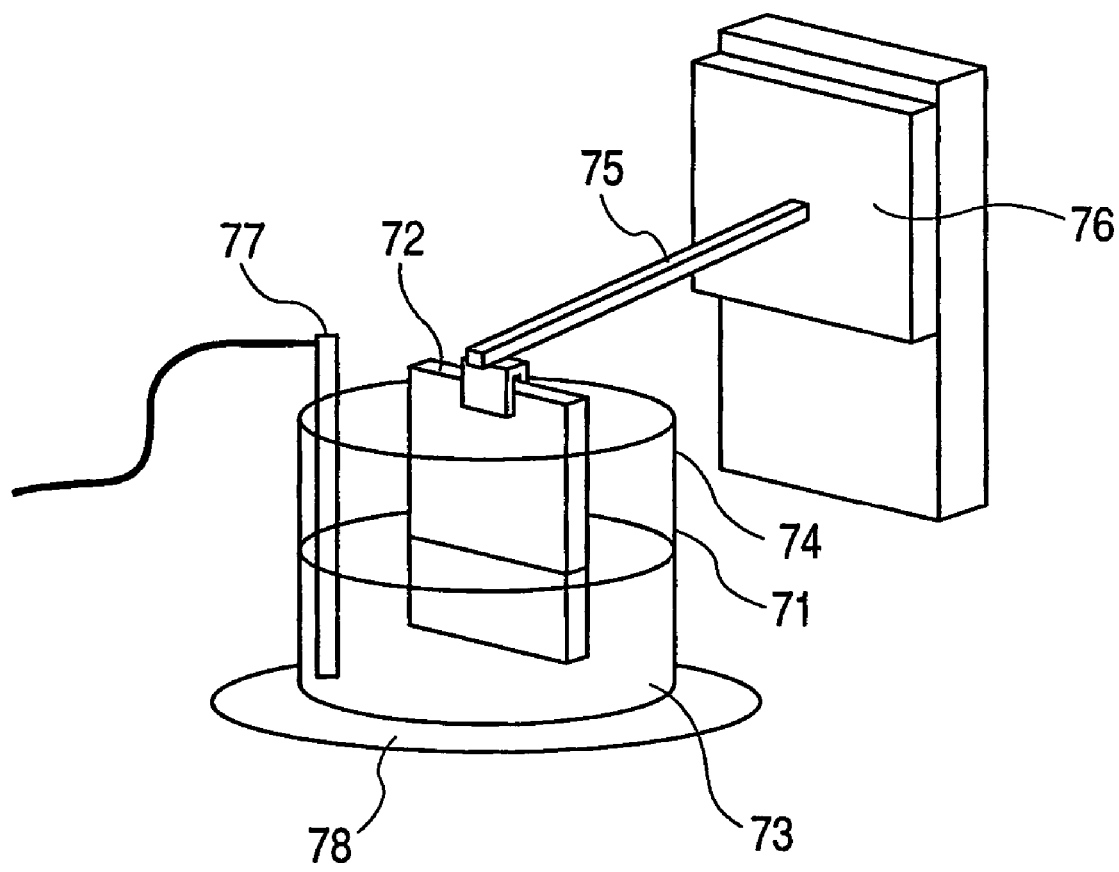
FIG. 7 is a schematic view showing a dip coating apparatus for preparing a film to be employed in the present invention.

As an example, a method for producing a mesostructured thin film utilizing dip coating will be explained. An example of the apparatus used for dip coating is illustrated in FIG. 7, in which a container 71, a substrate 72, and a precursor solution 73 are shown.

A substrate to be subjected to the formation of a mesostructured film is fixed by a substrate holder 74 to a rod 75 and is vertically moved by a z-stage 76. The direction of anisotropy of the substrate may be arbitrarily selected with respect to the direction of dip coating.

At the film formation, the precursor solution 73 is heated to a desired temperature, utilizing a heater 78 and a thermocouple 77, if necessary. In order to improve the control of the solution temperature, the entire container may be placed in a heat insulating container (not shown). The thickness of the film can be controlled by varying coating conditions.

Also, for positioning the precursor solution in an arbitrary position on the substrate, various methods can be employed, such as a micro-contact printing method, an ink jet method or a pen lithography method. These methods allow to pattern the mesostructured film at a desired position on the substrate.

The substrate coated with the solution is dried by evaporating the solvent in an atmosphere from room temperature to about 60° C. Then, if necessary, it is exposed to water vapor by holding the substrate in a high temperature atmosphere. The inventors estimate that, in these drying and vapor exposure steps, tubular assemblies of the surfactants are subjected to a structural anisotropy of the substrate whereby the pores are uniaxially orientated.

Through the method explained in the foregoing, a mesostructured film is obtained in which assemblies of the surfactants, having a polymerizable group in the molecular structure, are included in tubular pores. This film is defined as a precursor film for an oriented mesostructured film including a conjugated polymer, and is explained in the following.

The precursor mesostructured film prepared as explained above is subjected to thermal or light stimulation to polymerize the surfactant molecules present in each pore, thereby forming a polymer compound in the pore. A surfactant having a diacetylene group in the molecular structure allows to obtain a conjugated polymer polydiacetylene in the pore.

Polydiacetylene can be confirmed by infrared absorption spectroscopy and fluorescence spectroscopy, and the orientation of the polymer main chain in the pore can be confirmed by measuring polarized light via absorption spectroscopy and light emission spectroscopy.

In the following, the present invention will be further clarified by examples.

Example 1

In this example, a mesostructured silica film including uniaxially oriented tubular pores on a substrate was formed by employing a substrate subjected to a rubbing process, a cationic surfactant containing a diacetylene group and a heterogeneous nucleation/growth. Thermal polymerization of the surfactants was carried out in the oriented pores thereby forming a conjugated polymer compound having an oriented polymer chain.

A silica glass substrate was rinsed with acetone, isopropyl alcohol and pure water and subjected to surface cleaning in an ozone generating apparatus, spin-coated with an NMP solution of polyamic acid and baked for 1 hour at 200° C. to convert to polyimide A coating of the following structure:

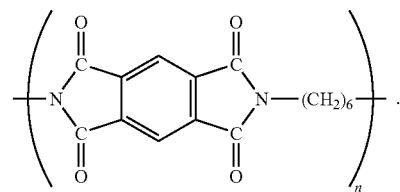

It was then subjected to a rubbing process under conditions shown in Table 1 to obtain a substrate.

TABLE 1

| Cloth material | Nylon |
| --- | --- |
| Roller diameter (mm) | 24 |
| Press-in amount (mm) | 0.4 |
| Revolution (rpm) | 1,000 |
| Stage speed (mm/min) | 600 |
| Number of repetition | 2 |

On this substrate, a mesostructured silica film was formed utilizing surfactants that have a polymerizable group in the molecular structure.

The cationic surfactant A employed in the present invention has the following molecular structure:

0.36 g of the surfactant A was dissolved in 12.8 ml of pure water, and 6.8 ml of concentrated hydrochloric acid (36%) was added. Then, 0.28 ml of tetraethoxysilane was added and the mixture was stirred for 3 minutes.

The substrate with the rubbing-treated polyimide was held in this reactant solution with the polyimide surface facing down, and then the vessel containing the reaction solution was sealed at 80° C. for 3 days for the formation of a mesostructured silica film. In order to achieve a satisfactory uniaxial alignment of the mesopores in the mesostructured silica film, the surface was covered with another silica glass plate using a spacer during the reaction. The reaction vessel employed was as schematically shown in FIG. 4.

The substrate in the reactant solution for the predetermined time was taken out from the vessel and rinsed sufficiently with pure water and dried at the room temperature in an ambient atmosphere. On the substrate, there was formed a continuous mesostructured silica film, which showed, when observed via an optical microscope, uniaxially oriented textures in a direction perpendicular to the rubbing direction, thereby suggesting an orientation of the pore.

X-ray diffraction analysis of this film confirmed a strong diffraction peak assigned to the (100) plane of hexagonal porous structures corresponding to a plane interval of 3.56 nm, thereby confirming that the film had a pore structure in which tubular pores are hexagonally packed.

For a quantitative evaluation of the uniaxial orientation of the tubular pores in this mesostructured silica film, this film was analyzed by in-plane X-ray diffraction. This method measures the in-plane rotational dependence of the X-ray diffraction intensity resulting from the (110) plane perpendicular to the substrate, as described in Chemistry of Material, vol. 12, p. 49, and can determine the orienting direction of the pores and its distribution. The in-plane rotation angle dependence of the diffraction intensity on the (110) plane, measured in the present example, indicated that the pores in the mesostructured silica film prepared in the present example were oriented perpendicular to the rubbing direction of the polyimide film, and the distribution of the orientation direction was about 12° from the full width of the half maximum of the diffraction peak in the in-plane rocking curve.

Based on the foregoing, it is shown that a mesostructured silica film having tubular pores of a uniaxial orientation can be formed on a substrate with a rubbing-treated polyimide film, utilizing surfactants containing a polymerizable diacetylene group as a hydrophobic group.

Such a mesostructured film was heated for 3 hours at 170° C. in a nitrogen gas atmosphere to polymerize the diacetylene group of the surfactants. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization took place without decomposition of the surfactant molecules. Also, fluorescence, which was not observed in the film before heating, was observed in the film after heating, thus confirming formation of polydiacetylene in the pores. An investigation of the polarizing characteristics of the observed fluorescence indicated that the polarization direction of fluorescence was confirmed to be perpendicular to the rubbing direction, namely along the direction of the oriented pores, thereby confirming orientation control of the polymer chains in the pores and orientation control of the conjugated polymer chains on a macroscopic scale.

Example 2

In this example, a uniaxially oriented mesostructured film was prepared by employing the same surfactant A as in Example 1 and the silicon (110) single crystal substrate to form polydiacetylene in the oriented pores.

The same reactant solution and the vessel were used for preparing the mesostructured silica as in Example 1.

The substrate was p-type Si (110) polished on one side and having a specific resistance of 100 Ωcm. It was cut into a size of 2×2 cm, then treated with a 1% solution of hydrofluoric acid for eliminating the spontaneous oxide film on the surface before use. The elimination of the oxide film can be confirmed by a fact that the surface of the silicon wafer becomes hydrophobic after the film elimination. After this process, the substrate was sufficiently rinsed with pure water, held by a substrate holder with the polished surface facing down, and placed in a reactant solution in a Teflon (registered trade name) vessel. The vessel was sealed for 3 days at 80° C. for the formation of a mesostructured silica film.

The substrate, which was in the reactant solution for a predetermined period of time, was taken out from the vessel and rinsed sufficiently with pure water and dried at room temperature. A continuous mesostructured silica film was formed on the substrate. Observation by an optical microscope showed uniaxially oriented textures, suggesting an orientation of the pore.

X-ray diffraction analysis of this film confirmed, as in Example 1, a strong diffraction peak assigned to the (100) plane of hexagonal porous structures corresponding to a plane interval of 3.56 nm, thereby confirming that the film had a pore structure in which tubular pores are hexagonally packed.

The uniaxial orientation of the tubular pores in this mesostructured silica film was analyzed by the in-plane X-ray diffraction as in Example 1. As a result, the distribution of orientation direction in the film prepared in the present example was about 29° from the full width of the half maximum of the diffraction peak in the in-plane rocking curve.

Based on the foregoing, it was shown that a mesostructured silica film having tubular pores of an uniaxial orientation was formed on the silicon (110) plane, utilizing surfactants containing a polymerizable diacetylene group as a hydrophobic group. The distribution of orientation of the pores in the mesostructured film of this example is wider than that in the film prepared in Example 1, but has advantages in that a rubbing-treated step is unnecessary and the film can be prepared directly on the conductive substrate.

This mesostructured film was irradiated for 4 hours with an ultraviolet light at 254 nm by using a high pressure mercury lamp. Infrared absorption spectroscopy of the mesostructured film was performed by an ATR method before and after irradiation. As a result, a strong absorption band of an acetylene bond at 2,260 cm$^{-1}$ observed before irradiation decreased in intensity after the irradiation, while other peaks did not show a change. This result confirmed that the polymerization took place without decomposition of the surfactant molecules. Also, fluorescence, which was not observed in the film before irradiation, was observed in the film after the irradiation, thus confirming formation of polydiacetylene in the pores. An investigation of the polarizing characteristics of the observed fluorescence indicated that the polarization direction of fluorescence was confirmed along the <001> direction of the Si substrate, namely along the direction of the oriented pores, thereby confirming orientation control of the polymer chain in the pores and orientation control of the conjugated polymer chains on a macroscopic scale.

While it is possible that photopolymerization, which was utilized in the present example, can result in an incomplete polymerization, as shown by the infrared absorption spectroscopy, it has an advantage in that a portion of polymerization can be patterned by light irradiation through a mask.

Example 3

In this example, a uniaxially oriented mesostructured film was prepared by employing the same surfactant A as in Examples 1 and 2, a silica glass substrate coating a Langmuir-Blodgett film, and polydiacetylene was prepared in the oriented pores. A Langmuir-Blodgett film was prepared with a polyimide used in Example 1, and the same reactant solution and vessel were used as in Examples 1 and 2.

Polyamic acid A and N,N-dimethylhexadecylamine were mixed in a 1:2 molar ratio to obtain an N,N-dimethylhexadecylamine salt of polyamic acid A. It was dissolved in N,N- dimethylacetamide to obtain a 0.5 mM solution, which was dropped onto the surface of water in an LB film forming apparatus, maintained at 20° C. A monomolecular film formed on the water surface was transferred onto the substrate with a dipping speed of 5.4 mm/min under a constant surface pressure of 30 mN/m.

The substrate was a silica glass substrate rinsed with acetone, isopropyl alcohol and pure water, then subjected to surface cleaning in an ozone generating apparatus, and a hydrophobic treatment.

Thirty layers of LB films of polyamic acid alkylamine salt were formed on the substrate and baked for 30 minutes at 300° C. to convert to polyimide A. An imidization by dehydration ring-closing of polyamic acid and liberation of an alkylamine were confirmed by infrared absorption spectroscopy. An orientation of the polymer chain in thus formed polyimide LB film was analyzed by dichroic properties of infrared absorption spectroscopy and was confirmed to be parallel to an extracting direction of the substrate at the LB film formation.

The same surfactant A containing a diacetylene group in the molecular structure as in Examples 1 and 2 was employed to prepare a precursor solution of the same composition as in Examples 1 and 2. The substrate coating the aforementioned layered LB film was supported in this solution with the film-coating surface facing downs, and then the vessel containing the reactant solution was sealed for 3 days at 80° C. for the formation of a mesostructured silica film. In order to achieve the satisfactory uniaxial alignment of the pores in the mesostructured silica film, the surface was covered with another silica glass plate using a spacer during the reaction.

The substrate, which was in the reactant solution for a predetermined period of time, was taken out from the vessel and rinsed sufficiently with pure water and was dried at room temperature. On the substrate, there was formed a continuous mesostructured silica film, which showed, in observations by an optical microscope, a uniaxially oriented texture in a direction perpendicular to the extracting direction of the substrate, thereby suggesting an orientation of the pore.

X-ray diffraction analysis of this film confirmed a strong diffraction peak assigned to the (100) plane of the hexagonal porous structure corresponding to a plane interval of 3.60 nm, thereby confirming that the film had a pore structure in which tubular pores are hexagonally packed.

For a quantitative evaluation of the uniaxial orientation of the tubular pores in this mesostructured silica film, the film was analyzed by in-plane X-ray diffraction. As a result, it was indicated that the alignment of the pores in the prepared film was oriented perpendicular to the extracting direction of the substrate and the distribution of the orientation direction was about 15° from the full width of the half maximum of the diffraction peak in the in-plane rocking curve.

Based on the foregoing, it was shown that a mesostructured silica film having tubular pores of a uniaxial orientation was formed on the substrate coating a polyimide LB film, utilizing surfactants containing a polymerizable diacetylene group as a hydrophobic group.

The above mesostructured film was heated for 3 hours at 170° C. in a nitrogen gas atmosphere to polymerize the diacetylene group of the surfactant. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization took place without decomposition of the surfactant molecules. Also, fluorescence, which was not observed in the film before heating, was observed in the film after the heating, thus confirming formation of polydiacetylene in the pores. An investigation of the polarizing characteristics of the observed fluorescence indicated that the polarization direction of fluorescence was confirmed to be perpendicular to the extracting direction of the substrate, namely along the orientation direction of the pores, thereby confirming orientation control of the polymer chain in the pores and orientation control of the conjugated polymer chains on a macroscopic scale.

Example 4

In this example, a uniaxially oriented mesostructured film in which tubular pores were oriented in a direction and in which a pore wall was constituted of inorganic-organic nanocomposites was prepared by employing a substrate with the rubbing-treated polyimide film as in Example 1, the same surfactant A as in Examples 1 to 3, and a precursor (silicon alkoxide A) represented by the following structural formula instead of the silicon alkoxide employed in Examples 1 to 3, and a conjugated polymer chain was polymerized in the pores.

0.36 g of the surfactant A was dissolved in 12.8 ml of pure water, and 3.8 ml of concentrated hydrochloric acid (36%) was added. Then, 0.50 g of the aforementioned silicon alkoxide A was added and the mixture was stirred for 3 minutes.

The substrate with rubbing-treated polyimide was supported in this reactant solution with the polyimide surface facing down, and then the vessel containing the reactant solution was sealed for 3 days at 70° C. for the formation of a mesostructured silica film. In order to achieve the satisfactory uniaxial alignment of the pores in the mesostructured silica film, the surface was covered with another silica glass plate using a spacer during the reaction.

The substrate, which was in the reactant solution for a predetermined period of time, was taken out from the vessel and rinsed sufficiently with pure water and dried at room temperature in an ambient atmosphere. On the substrate, there was formed a continuous mesostructured silica film, which showed, when observed through an optical microscope, a uniaxially oriented texture in a direction perpendicular to the rubbing direction, thereby suggesting an orientation of the pore.

X-ray diffraction analysis of this film confirmed a strong diffraction peak assigned to the (100) plane of hexagonal porous structures corresponding to a plane interval of 3.48 nm, thereby confirming that the film had a pore structure in which tubular pores are hexagonally packed.

For a quantitative evaluation of the uniaxial orientation of the tubular pores in this mesostructured silica film, the film was analyzed by in-plane X-ray diffraction. As a result, it was indicated that the pores in the mesostructured silica film prepared in the present example were oriented perpendicular to the rubbing direction of the polyimide, and the distribution of the orientation direction was about 14° from the full width of the half maximum of the diffraction peak in the in-plane rocking curve.

Based on the foregoing, it was shown that a mesostructured silica film having tubular pores of a uniaxial orientation, in which the pore wall was constituted of a silica-organic hybrid material, was formed on a substrate with the rubbing-treated polyimide film, utilizing surfactants containing a polymerizable diacetylene group as a hydrophobic group.

The above mesostructured film was heated for 3 hours at 170° C. in a nitrogen gas atmosphere to polymerize the diacetylene group of the surfactant. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization took place without decomposition of the surfactant molecules and the organic component in the pore wall. Also, fluorescence, which was not observed in the film before heating, was observed in the film after the heating, thus confirming formation of polydiacetylene in the pore. An investigation of the polarizing characteristics of the observed fluorescence indicated that the polarization direction of fluorescence was confirmed to be perpendicular to the rubbing direction, namely along the direction of the oriented pores, thereby confirming orientation control of the polymer chain in the pores and orientation control of the conjugated polymer chains on a macroscopic scale.

Example 5

In this example, a mesostructured tin oxide film having uniaxially oriented tubular pores was prepared by a sol-gel method (dip coating) on the rubbing-treated substrate and by employing a nonionic surfactant having a diacetylene group. The surfactant was thermally polymerized in the pores to form oriented polymer chains of a conjugated polymer.

The nonionic surfactant B employed in the present example had the following structure:

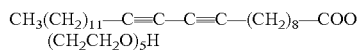

$CH_3(CH_2)_{11}-C\equiv C-C\equiv C-(CH_2)_8-COO$
$(CH_2CH_2O)_5H$ 2.0 g of the nonionic surfactant B was dissolved in 20 g of ethanol, and 5.2 g of tin tetrachloride was added.

A silica glass substrate with rubbing-treated polyimide film was prepared in the same manner as in Example 1. The mesostructured tin oxide film was prepared by dip coating with the above solution and dried in an environment at a temperature of 40° C. and a relative humidity of 20%. The direction of dip coating was parallel or perpendicular to the rubbing direction of the substrate.

After drying for 10 hours, the film was maintained for 40 hours in an environment at a temperature of 40° C. and a relative humidity of 80%, and the relative humidity was then reduced to 20%. The obtained film was completely transparent.

X-ray diffraction analysis of this film confirmed a strong diffraction peak assigned to the (100) plane of hexagonal porous structures corresponding to a plane interval of 4.60 nm, thereby confirming that the film had a pore structure in which tubular pores are hexagonally packed.

For a quantitative evaluation of the uniaxial orientation of the tubular pores in this mesostructured tin oxide film, the film was analyzed by in-plane X-ray diffraction. As a result, it was indicated that the pores in the prepared film were oriented parallel to the rubbing direction, and the distribution of the orientation direction was about 15° from the full width of the half maximum of the diffraction peak in the in-plane rocking curve.

No difference was observed in the orientation state between the films in which the dip coating direction was parallel or perpendicular to the rubbing direction of the polyimide film, showing that the observed orientation of the tubular pores was restricted by the anisotropy of the substrate.

The above mesostructured tin oxide film was heated for 3 hours at 170° C. in a nitrogen gas atmosphere to polymerize the diacetylene group of the surfactant. It was indicated by X-ray diffraction analysis that the pore structure shrank during a period thereof, but retained the structure by heating. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pores. An investigation of the polarizing characteristics of the observed fluorescence indicated that the polarization direction of fluorescence was confirmed to be parallel to the rubbing direction, namely along the direction of the oriented pores, thereby confirming orientation control of the polymer chain in the pores and orientation control of the conjugated polymer chains on a macroscopic scale.

Example 6

In this example, a mesostructured titanium oxide film having uniaxially oriented tubular pores was prepared by a sol-gel (dip coating) method on the rubbing-treated substrate by employing a nonionic surfactant having a diacetylene group, and the surfactant was thermally polymerized in the pores to form oriented polymer chains of a conjugated polymer.

The same nonionic surfactant B was employed in the present example as in Example 5.

2.0 g of the nonionic surfactant B was dissolved in 20 g of ethanol, and 3.8 g of titanium tetrachloride was added.

A silica glass substrate with rubbing-treated polyimide film was prepared in the same manner as in Example 1. The mesostructured titanium oxide film was prepared by dip coating with the above solution, and dried in an environment at a temperature of 40° C. and a relative humidity of 20%. The direction of dip coating was parallel or perpendicular to the rubbing direction of the substrate.

After drying for 10 hours, the film was maintained for 1 hour in an environment at a temperature of 40° C. and a relative humidity of 80%, and the relative humidity was then reduced to 20%. The obtained film was completely transparent.

X-ray diffraction analysis of this film confirmed a strong diffraction peak assigned to the (100) plane of hexagonal porous structures corresponding to a plane interval of 4.56 nm, thereby confirming that the film had a pore structure in which tubular pores are hexagonally packed.

For a quantitative evaluation of uniaxial orientation of the tubular pores in this mesostructured titanium oxide film, the film was analyzed by in-plane X-ray diffraction. As a result, it was indicated that the pores in the prepared film were oriented parallel to the rubbing direction, and the distribution of the orientation direction was about 16° from the full width of the half maximum of the diffraction peak in the in-plane rocking curve.

No difference was observed in the orientation state between the films in which the dip coating direction was parallel or perpendicular to the rubbing direction of the polyimide film, showing that the observed orientation of the tubular pores was restricted by the anisotropy of the substrate.

The above mesostructured titanium oxide film was heated for 3 hours at 170° C. in a nitrogen gas atmosphere to polymerize the diacetylene group of the surfactant. The X-ray diffraction analysis showed that although the period of the pore structures shrank by heating, the pore structure was maintained. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pores. An investigation of the polarizing characteristics of the observed fluorescence indicated that the polarization direction of fluorescence was confirmed to be parallel to the rubbing direction, namely along the direction of the oriented pores, thereby confirming orientation control of the polymer chain in the pores and orientation control of the conjugated polymer chains on a macroscopic scale.

Example 7

In this example, a mesostructured silica film having uniaxially oriented tubular pores was prepared by a sol-gel (dip coating) method on the rubbing-treated substrate as in Example 1 and the surfactant A employed in Examples 1 to 4, and the surfactant was thermally polymerized in the pores to form oriented polymer chains of a conjugated polymer.

1.6 g of the cationic surfactant A was dissolved in 20 g of ethanol, and 4.2 g of tetraethoxysilane was added. 0.27 g of water and 0.8 g of 0.1 M hydrochloric acid were added to this solution and stirred for 2 hours.

This solution was applied on the rubbing-treated substrate by dip coating and dried in an environment at a temperature of 25° C. and a relative humidity of 50%. The dip coating direction was parallel or perpendicular to the rubbing direction of the substrate. The obtained film was completely transparent.

X-ray diffraction analysis of this film confirmed a strong diffraction peak assigned to the (100) plane of hexagonal porous structures corresponding to a plane interval of 4.08 nm, thereby confirming that the film had a pore structure in which tubular pores are hexagonally packed.

For a quantitative evaluation of the uniaxial orientation of the tubular pores in this mesostructured silica film, this film was analyzed by in-plane X-ray diffraction. As a result, it was indicated that the pores in the prepared film were oriented perpendicular to the rubbing direction, and the distribution of the orientation direction was about 8° from the full width of the half maximum of the diffraction peak in the in-plane rocking curve.

No difference was observed in the orientation state between the films in which dip coating direction was parallel or perpendicular to the rubbing direction of the polyimide film, showing that the observed orientation of the tubular pores was restricted by the anisotropy of the substrate.

Based on the foregoing, it was shown that a mesostructured silica film having tubular pores of a uniaxial orientation was formed on the rubbing treated substrate, utilizing surfactants containing a polymerizable diacetylene group as a hydrophobic group.

The above mesostructured film was heated for 3 hours at 170° C. in a nitrogen gas atmosphere to polymerize the diacetylene group of the surfactant. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pores. An investigation of the polarizing characteristics of the observed fluorescence indicated that the polarization direction of fluorescence was confirmed to be perpendicular to the rubbing direction, namely along the direction of the oriented pores, thereby confirming orientation control of the polymer chain in the pores and orientation control of the conjugated polymer chains on a macroscopic scale.

Example 8

In this example, a mesostructured silica film having uniaxially oriented tubular pores was prepared by a sol-gel (dip coating) method on the rubbing-treated substrate as in Example 1 and a cationic surfactant containing a thiophene group, and the surfactant was subjected to a chemical oxidation polymerization in the pores to form oriented polymer chains of a conjugated polymer.

A cationic surfactant E employed in the present example had a structure shown in FIG. 5E.

2.3 g of the cationic surfactant E was dissolved in 20 g of ethanol, and 4.2 g of tetraethoxysilane was added. 0.27 g of water and 0.8 g of 0.1 M hydrochloric acid were added to this solution and stirred for 2 hours to obtain a precursor solution.

This solution was applied on the rubbing-treated substrate by dip coating and dried in an environment at a temperature of 25° C. and a relative humidity of 50%. The dip coating direction was parallel or perpendicular to the rubbing direction of the substrate. The obtained film was completely transparent.

X-ray diffraction analysis of this film confirmed a strong diffraction peak assigned to the (100) plane of hexagonal porous structures corresponding to a plane interval of 4.12 nm, thereby confirming that the film had a pore structure in which tubular pores are hexagonally packed.

For a quantitative evaluation of the uniaxial orientation of the tubular pores in this mesostructured silica film, this film was analyzed by in-plane X-ray diffraction. As a result, it was indicated that the pores in the prepared film were oriented perpendicular to the rubbing direction.

No difference was observed in the orientation state between the films in which dip coating direction was parallel or perpendicular to the rubbing direction of the polyimide film, showing that the observed orientation of the tubular pores was restricted by the anisotropy of the substrate.

Based on the foregoing, it was shown that a mesostructured silica film having tubular pores of a uniaxial orientation was formed on the rubbing-treated substrate, utilizing surfactants containing a polymerizable thiophene group as a hydrophobic group.

The above mesostructured film was immersed in diethylether solution of iron chloride for 1 minute at room temperature to polymerize the thiophene group of the surfactant. In the ultraviolet-visible absorption spectra of the mesostructured film obtained before and after the immersion, a broad absorption at 500 nm was observed only in the spectrum after the immersion, thereby confirming the polymerization reaction of the surfactant molecules. Formation of polythiophene in the pores was thus confirmed. The polarized absorption of the mesostructured silica film showed the anisotropy. This fact confirmed orientation control of the polymer chain in the pores and orientation control of the conjugated polymer chains on a macroscopic scale.

Example 9

In this example, a mesostructured silica film having uniaxially oriented tubular pores was prepared by a sol-gel (spin coating) method on the rubbing-treated substrate as in Example 1 and a cationic surfactant containing a pyrrole group, and the surfactant was subjected to a chemical oxidation polymerization in the pores to form oriented polymer chains of a conjugated polymer.

A cationic surfactant D employed in the present example had a structure shown in FIG. 5D.

1.6 g of the cationic surfactant D was dissolved in 20 g of ethanol, and 4.2 g of tetraethoxysilane was added. 0.27 g of water and 0.8 g of 0.1 M hydrochloric acid were added to this solution and stirred for 2 hours to obtain a precursor solution.

This solution was applied on the rubbing-treated substrate by spin coating. The spin coating was conducted with a revolution speed of 2,000 rpm and a rotation time of 20 seconds. The prepared film was dried in an environment at a temperature of 25° C. and a relative humidity of 50%. The obtained film was completely transparent.

X-ray diffraction analysis of this film confirmed a strong diffraction peak assigned to the (100) plane of hexagonal porous structures corresponding to a plane interval of 4.10 nm, thereby confirming that the film had a pore structure in which tubular pores are hexagonally packed.

For a quantitative evaluation of the uniaxial orientation of the tubular pores in this mesostructured silica film, the film was analyzed by in-plane X-ray diffraction. As a result, it was indicated that the pores in the prepared film were oriented parallel to the rubbing direction, and the distribution of the orientation direction was about 13° from the full width of the half maximum of the diffraction peak in the in-plane rocking curve.

Based on the foregoing, it was shown that a mesostructured silica film having tubular pores of a uniaxial orientation was formed on the rubbing-treated substrate, utilizing surfactants containing a polymerizable pyrrole group as a hydrophobic group.

The above mesostructured film was immersed in a solution of iron chloride in diethylether for 1 minute at room temperature to polymerize the pyrrole group of the surfactant. In an ultraviolet-visible-near infrared absorption spectra of the mesostructured film obtained before and after the immersion, a broad absorption at 1,000 nm was observed only in the spectrum after the immersion, thereby confirming the polymerization reaction of the surfactant molecules. Formation of polypyrrole in the pores was thus confirmed. An investigation of the polarizing characteristics of the observed absorption indicated that the polarization direction of absorption was confirmed to be parallel to the rubbing direction, namely along the direction of the oriented pores, thereby confirming orientation control of the polymer chain in the pores and orientation control of the conjugated polymer chains on a macroscopic scale.

Example 10

In this example, a mesostructured silica film having uniaxially oriented tubular pores was prepared by a sol-gel (mist coating) method on the rubbing-treated substrate as in Example 1 and a cationic surfactant containing a pyrrole group, and the surfactant was subjected to a chemical oxidation polymerization in the pores to form oriented polymer chains of a conjugated polymer.

The cationic surfactant D employed in the present example had a structure shown in FIG. 5D.

1.6 g of the cationic surfactant D was dissolved in 20 g of ethanol, and 4.2 g of tetraethoxysilane was added. 0.27 g of water and 0.8 g of 0.1 M hydrochloric acid were added to this solution and stirred for 2 hours to obtain a precursor solution.

The precursor solution was applied on the rubbing-treated substrate by mist coating, and the prepared film was dried in an environment at a temperature of 25° C. and a relative humidity of 50%. The obtained film was completely transparent.

X-ray diffraction analysis of this film confirmed a strong diffraction peak assigned to the (100) plane of hexagonal porous structures corresponding to a plane interval of 4.12 nm, thereby confirming that the film had a pore structure in which tubular pores are hexagonally packed.

For a quantitative evaluation of the uniaxial orientation of the tubular pores in this mesostructured silica film, this film was analyzed by in-plane X-ray diffraction. As a result, it was indicated that the pores in the prepared film were oriented parallel to the rubbing direction, and the distribution of the orientation direction was about 14° from the full width of the half maximum of the diffraction peak in the in-plane rocking curve.

Based on the foregoing, it was shown that a mesostructured silica film having tubular pores of a uniaxial orientation was formed on the rubbing-treated substrate, utilizing surfactants containing a polymerizable pyrrole group as a hydrophobic group.

The above mesostructured film was immersed in a diethylether solution of iron chloride for 1 minute at room temperature to polymerize the pyrrole group of the surfactant. In ultraviolet-visible-near infrared absorption spectra of the mesostructured film obtained before and after the immersion, a broad absorption at 1,000 nm was observed only in the spectrum after the immersion, thereby confirming the polymerization reaction of the surfactant molecules. Formation of polypyrrole in the pores was thus confirmed. An investigation of the polarizing characteristics of the observed absorption indicated that the polarization direction of absorption was confirmed to be parallel to the rubbing direction, namely along the direction of the oriented pores, thereby confirming orientation control of the polymer chain in the pores and orientation control of the conjugated polymer chains on a macroscopic scale.

Example 11

In this example, a mesostructured silica film having uniaxially oriented tubular pores was prepared by a soft lithography method in an arbitrary position on the rubbing-treated substrate as in Example 1 and a surfactant A employed in Examples 1 to 4, and the surfactant was subjected to a thermal polymerization in the pores to form oriented polymer chains of a conjugated polymer.

1.6 g of the cationic surfactant A was dissolved in 20 g of ethanol, and 4.2 g of tetraethoxysilane was added. 0.27 g of water and 0.8 g of 0.1 M hydrochloric acid were added to this solution and stirred for 2 hours to obtain a precursor solution.

The micromold made of polydimethylsiloxane was pressed on the rubbing-treated substrate and the precursor solution was poured from the end of the mold, whereby the solution was introduced by capillary action into the mold.

After standing for 5 hours, the mold was removed from the substrate to obtain the patterned mesostructured film.

After drying in the air, it was confirmed that a transparent film was formed only in an area of coating by the soft lithography method.

X-ray diffraction analysis of this film confirmed a strong diffraction peak assigned to the (100) plane of hexagonal porous structures corresponding to a plane interval of 4.07 nm, thereby confirming that the film had a pore structure in which tubular pores are hexagonally packed.

For a quantitative evaluation of the uniaxial orientation of the tubular pores in this mesostructured silica film, the film was analyzed by in-plane X-ray diffraction. As a result, it was indicated that the pores in the prepared film were oriented perpendicular to the rubbing direction, and the distribution of the orientation direction was about 11° from the full width of the half maximum of the diffraction peak in the in-plane rocking curve.

Based on the foregoing, it was shown that a patterned mesostructured silica film having tubular pores of a uniaxial orientation was formed on the rubbing-treated substrate, utilizing surfactants containing a polymerizable diacetylene group as a hydrophobic group.

The above mesostructured film was heated for 3 hours at 170° C. in a nitrogen gas atmosphere to polymerize the diacetylene group of the surfactant. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pore. An investigation of the polarizing characteristics of the observed fluorescence indicated that the polarization direction of fluorescence was confirmed to be perpendicular to the rubbing direction, namely along the direction of the oriented pores, thereby confirming orientation control of the polymer chain in the pores and orientation control of the conjugated polymer chains on a macroscopic scale.

Example 12

In this example, a mesostructured silica film having uniaxially oriented tubular pores was prepared by a pen lithography method in an arbitrary position on the rubbing-treated substrate as in Example 1 and a surfactant A employed in Examples 1 to 4, and was subjected to a thermal polymerization in the pores to form oriented polymer chains of a conjugated polymer.

1.6 g of the cationic surfactant A was dissolved in 20 g of ethanol, and 4.2 g of tetraethoxysilane was added. 0.27 g of water and 0.8 g of 0.1 M hydrochloric acid were added to this solution and stirred for 2 hours to obtain a precursor solution.

The solution was patterned on the rubbing-treated substrate by a pen lithography method, and the prepared film was dried in the air at room temperature. The pen lithography was conducted under conditions of a pen orifice of 50.0 μm, a stage speed of 2.5 cm/s and a fluid supply rate of 4.0 cm.

By observing the substrate after drying in air, it was confirmed that a transparent film was formed only in an area of coating by the pen lithography method.

X-ray diffraction analysis of this film confirmed a strong diffraction peak assigned to the (100) plane of hexagonal porous structures corresponding to a plane interval of 4.09 nm, thereby confirming that the film had a pore structure in which tubular pores are hexagonally packed.

For a quantitative evaluation of the uniaxial orientation of the tubular pores in this mesostructured silica film, this film was analyzed by in-plane X-ray diffraction. As a result, it was indicated that the pores in the prepared film were oriented perpendicular to the rubbing direction, and the distribution of the orientation direction was about 10° from the full width of the half maximum of the diffraction peak in the in-plane rocking curve.

Based on the foregoing, it was shown that a patterned mesostructured silica film having tubular pores of a uniaxial orientation was formed on the rubbing-treated substrate, utilizing surfactants containing a polymerizable diacetylene group as a hydrophobic group.

The above mesostructured film was heated for 3 hours at 170° C. in a nitrogen gas atmosphere to polymerize the diacetylene group of the surfactant. Infrared absorption spectroscopy of the mesostructured film was performed by an ATR method before and after heating. As a result, a strong absorption band of an acetylene bond at 2,260 cm$^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pores. An investigation of the polarizing characteristics of the observed fluorescence indicated that the polarization direction of fluorescence was confirmed to be perpendicular to the rubbing direction, namely along the direction of the oriented pores, thereby confirming orientation control of the polymer chain in the pores and orientation control of the conjugated polymer chains on a macroscopic scale.

Example 13

In this example, a mesostructured silica film having uniaxially oriented tubular pores was prepared by an ink jet method in an arbitrary position on the rubbing-treated substrate as in Example 1 and a surfactant A employed in Examples 1 to 4, and was subjected to a thermal polymerization in the pores to form oriented polymer chains of a conjugated polymer.

1.6 g of the cationic surfactant A was dissolved in 20 g of ethanol, and 4.2 g of tetraethoxysilane was added. 0.27 g of water and 0.8 g of 0.1 M hydrochloric acid were added to this solution and stirred for 2 hours to obtain a precursor solution.

The solution was applied on the rubbing-treated substrate by an ink jet method in a pattern, and the prepared film was dried in air at room temperature.

By observing the substrate after drying in air, it was confirmed that a transparent film was formed only in an area formed by the ink jet method.

X-ray diffraction analysis of this film confirmed a strong diffraction peak assigned to the (100) plane of hexagonal porous structures corresponding to a plane interval of 4.12 nm, thereby confirming that the film had a pore structure in which tubular pores are hexagonally packed.

For a quantitative evaluation of the uniaxial orientation of the tubular pores in this mesostructured silica film, this film was analyzed by in-plane X-ray diffraction. As a result, it was indicated that the pores in the prepared film were oriented perpendicular to the rubbing direction, and the distribution of the orientation direction was about 12° from the full width of the half maximum of the diffraction peak in the in-plane rocking curve.

Based on the foregoing, it was shown that a mesostructured silica film having tubular pores of a uniaxial orientation was formed on the rubbing-treated substrate, utilizing surfactants containing a polymerizable diacetylene group as a hydrophobic group.

The above mesostructured film was heated for 3 hours at 170° C. in a nitrogen gas atmosphere to polymerize the diacetylene group of the surfactant. Infrared absorption spectroscopy of the mesostructured film was performed by an ATR method before and after heating. As a result, a strong absorption band of an acetylene bond at 2,260 $cm^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pores. An investigation of the polarizing characteristics of the observed fluorescence indicated that the polarization direction of fluorescence was confirmed to be perpendicular to the rubbing direction, namely along the direction of the oriented pores, thereby confirming orientation control of the polymer chain in the pores and orientation control of the conjugated polymer chains on a macroscopic scale.

Comparative Example

An ethanol solution of tin tetrachloride and the nonionic surfactant B was prepared in the same manner as in Example 5, and this precursor solution was applied by dip coating on an isotropic silica glass substrate without coating or particular processing on the surface.

The coated substrate was dried, as in Example 5, for 10 hours in an environment at a temperature of 40° C. and a relative humidity of 20%, then maintained for 40 hours in an environment at a temperature of 40° C. and a relative humidity of 80%, and the relative humidity was then reduced to 20%. The obtained film was completely transparent.

X-ray diffraction analysis of this film confirmed a strong diffraction peak assigned to the (100) plane of hexagonal porous structures corresponding to a plane interval of 4.60 nm, thereby confirming that the film had a pore structure in which tubular pores are hexagonally packed.

For a quantitative evaluation of the uniaxial orientation of the tubular pores in this mesostructured tin oxide film, this film was analyzed by in-plane X-ray diffraction. As a result, the orientation state of the pores in the prepared film was completely isotropic and no increase in the X-ray diffraction intensity in a particular direction was observed.

The above mesostructured tin oxide film was heated for 3 hours at 170° C. in a nitrogen gas atmosphere to polymerize the diacetylene group of the surfactant. It was indicated by X-ray diffraction analysis that the pore structures shrank in a period thereof, but retained the pore structure by heating. Infrared absorption spectroscopy of the mesostructured film was performed by an ATR method before and after heating. As a result, a strong absorption band of an acetylene bond at 2,260 $cm^{-1}$ observed before heating vanished after the heating, while other peaks did not show a change. This result confirmed that the polymerization of the surfactant molecules took place without decomposition of the surfactant molecules. Also, fluorescence, which was not observed in the film before heating, was observed in the film after the heating, thus confirming formation of polydiacetylene in the pores. In an investigation of the polarizing characteristics of the observed fluorescence, dependence on polarization was not observed in the intensity of the fluorescence, thus confirming that any specific orientation was absent in the polymer chains.

As described above, according to the present invention, the mesostructured film having tubular pores of a uniaxial orientation can be formed on the substrate with surface anisotropy, utilizing polymerizable surfactants. Further, by polymerizing the surfactant in the uniaxially oriented pores, a structure in which conjugated polymers are oriented in one direction can be obtained.

The invention claimed is:

1. A method for producing a structured material comprising steps of:
   providing a substrate showing anisotropy on a surface;
   then bringing the surface of the substrate into contact with a solution comprising a surfactant, which has a functional group for polymerization in a molecular structure, a solvent therefor, and a matrix raw material, which can form a matrix by hydrolysis and condensation; and
   maintaining the contact for a predetermined time to form the matrix on the surface and to assemble the surfactant in the matrix in a predetermined direction based on the anisotropy of the substrate.

2. The method according to claim 1, wherein said surfactant has a diacetylene, thiophene, or pyrrole group in the molecular structure.

3. The method according to claim 1, wherein, in said maintaining step, the substrate is exposed to water vapor.

4. The method according to claim 1, further comprising a step of polymerizing the surfactant after the maintaining step.

5. The method according to claim 4, wherein said polymerizing step is executed by thermal polymerization, photopolymerization, or chemical polymerization.

* * * * *